Sept. 18, 1973    A. J. TRAHAN    3,759,686
NECK RING ARMS FOR GLASSWARE FORMING MACHINE
Filed Aug. 13, 1971    3 Sheets-Sheet 1
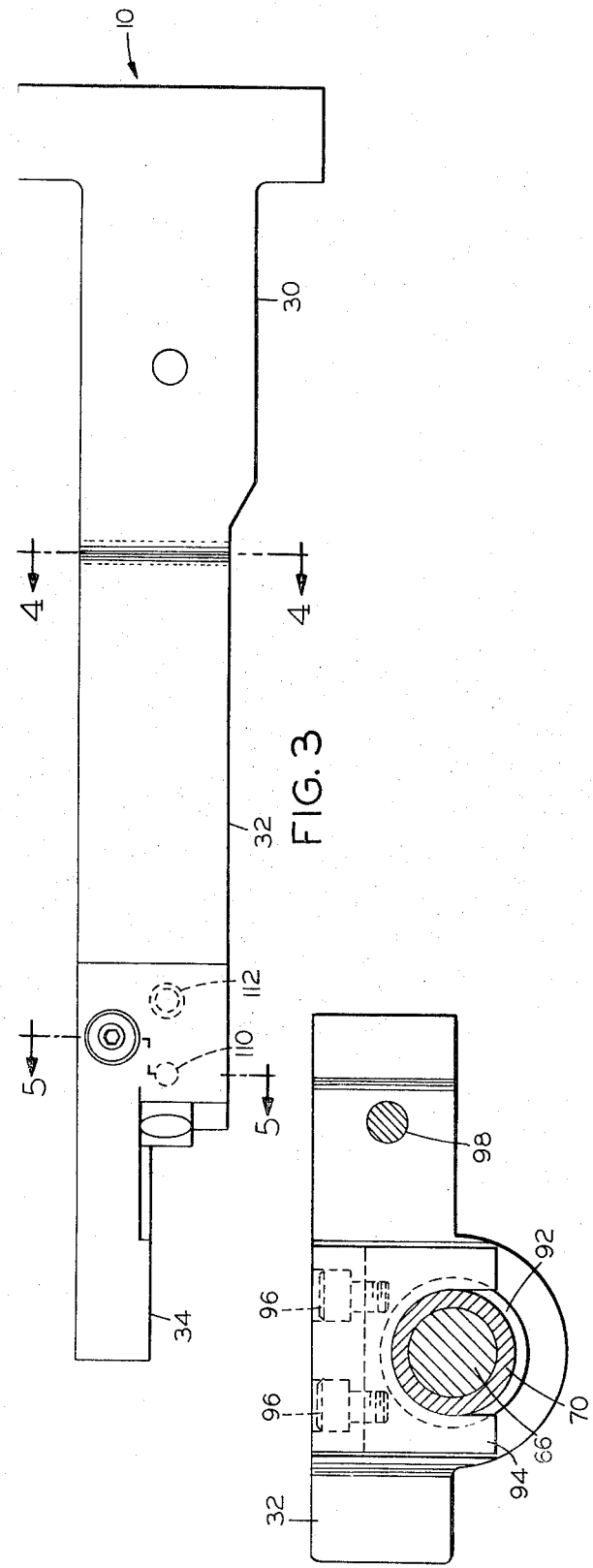
FIG. 3
FIG. 4
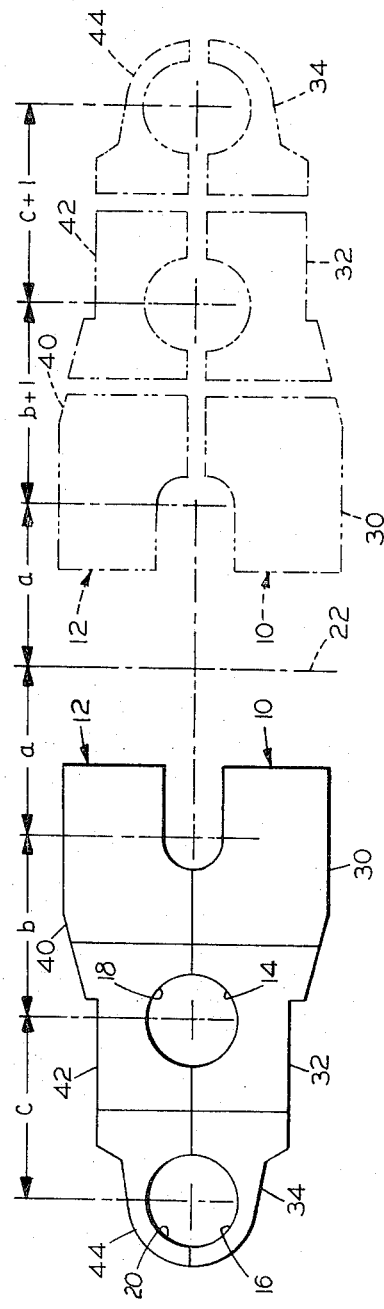
FIG. 1
Inventor
Albert J. Trahan
By Mornick, Paukling & Huber
Attorneys

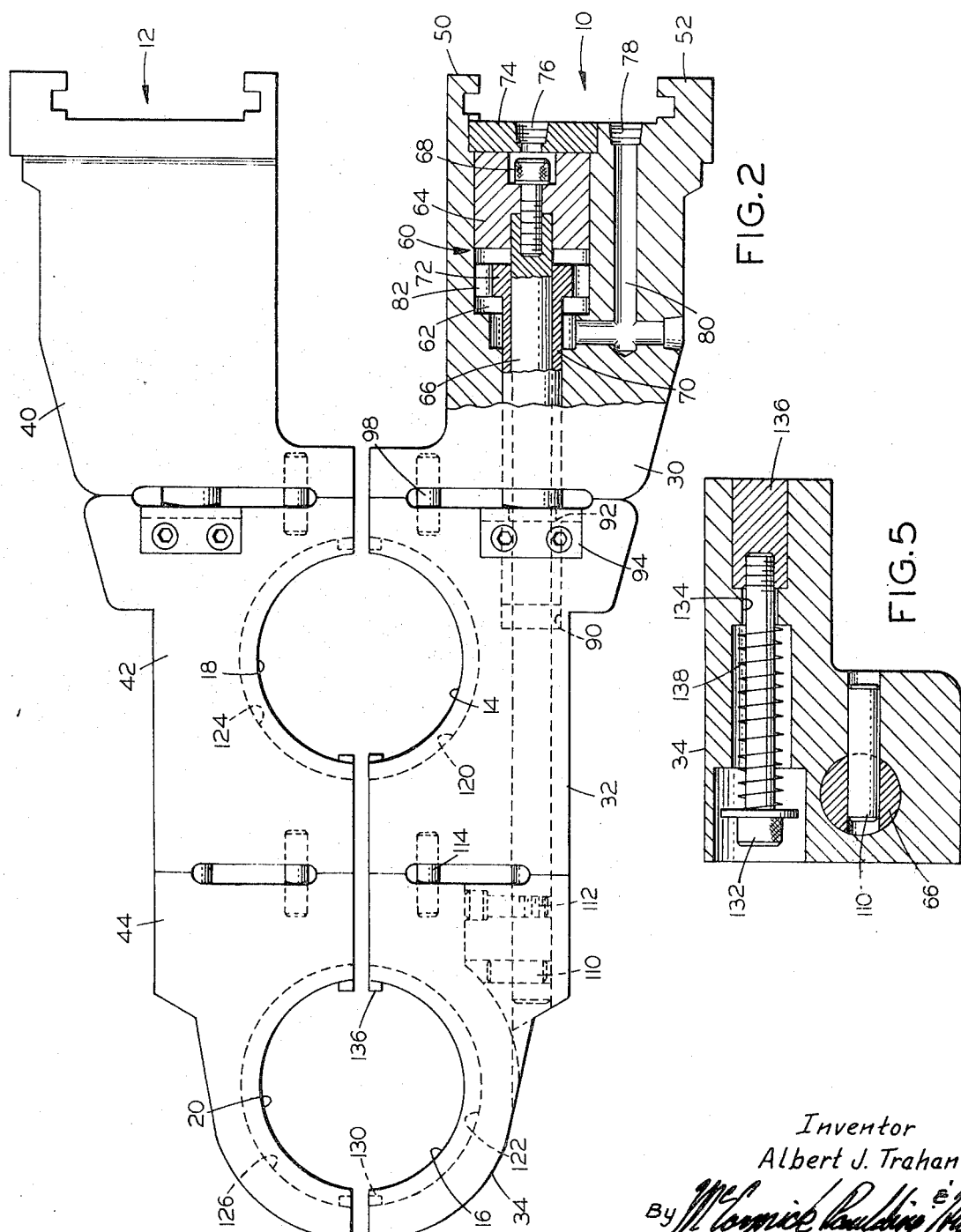

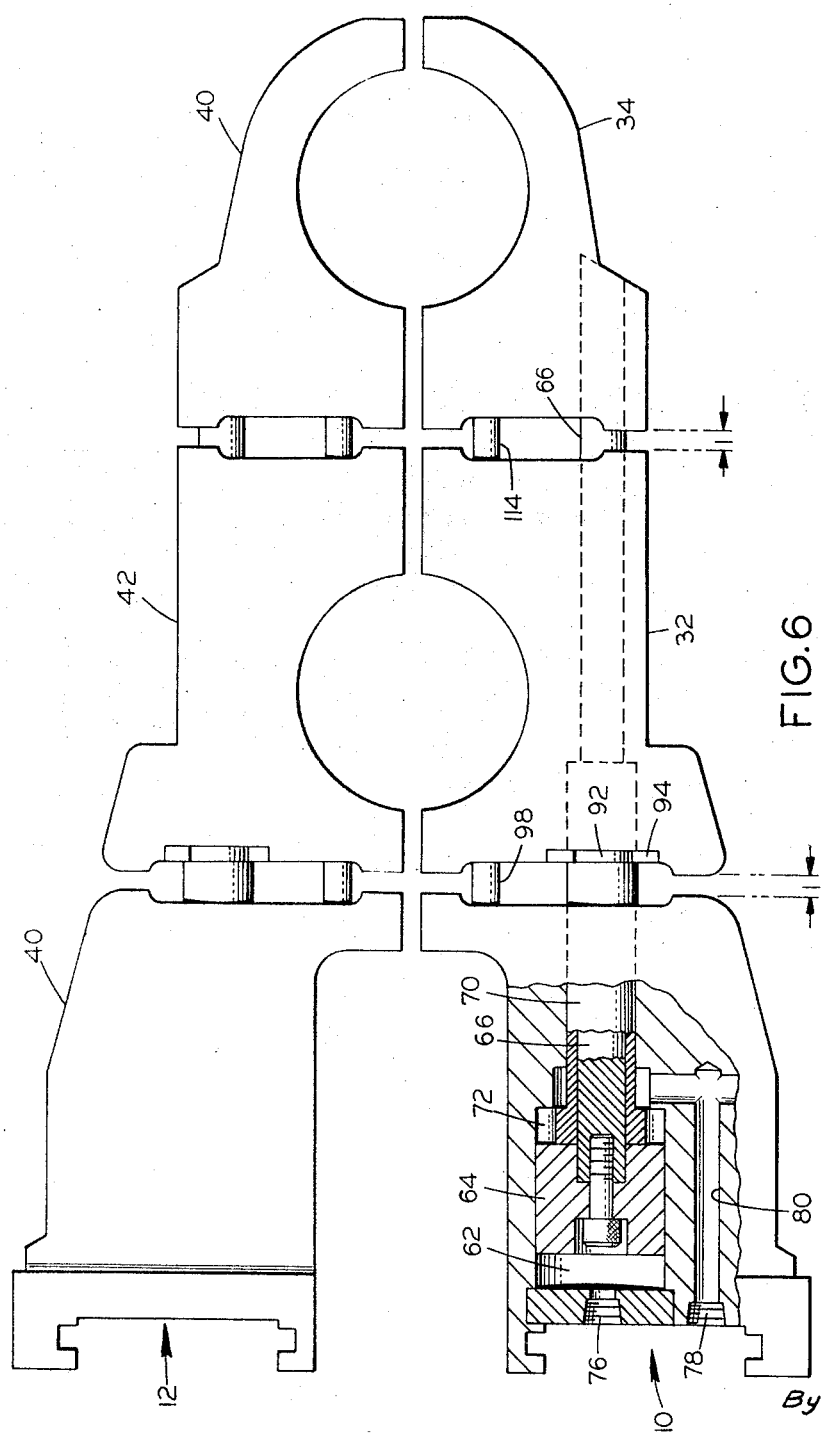

United States Patent Office 3,759,686
Patented Sept. 18, 1973

3,759,686
NECK RING ARMS FOR GLASSWARE
FORMING MACHINE
Albert J. Trahan, Vernon, Conn., assignor to Emhart
Corporation, Bloomfield, Conn.
Filed Aug. 13, 1971, Ser. No. 171,599
Int. Cl. C03b 9/00
U.S. Cl. 65—167
18 Claims

ABSTRACT OF THE DISCLOSURE

A pair of complementary neck ring arms are disclosed for use in a glassware forming machine having a blank mold in which a parison is formed and a blow mold to which the parison is transferred while being held in a pair of neck ring segments supported respectively in the arms. The neck ring arms have recesses for accommodating one or more pairs of neck ring segments so that single, double, triple, or other multiple-gob individual section (IS) glassware forming machines may utilize the arms. The arms are comprised of several extendible sections that permit the spacing between the blank molds which form the parisons on one side of the machine to be different from the spacing between blow molds which receive the parisons at the other side of the machine and also allow the pivot point about which the support arms rotate during transfer between the two sides of the machine to be offset from a point midway between the two sides.

BACKGROUND OF THE INVENTION

This invention relates to the field or glassware forming machines and the like including plastic forming machines and, more particularly, is concerned with glassware machines utilized in forming hollow glass containers by means of a blank or parison forming mold and a blow mold in which the parison is expanded to its final size.

Glassware forming machines which utilize both blank molds and blow molds are already well known in the art as indicated by U.S. Pat. No. 1,911,119, issued May 23, 1933, to Ingle. This type of machine has received wide acceptance in the glassware industry and its basic operations are still utilized today in making hollow glass articles such as returnable and non-returnable beverage bottles and similar items. In such glassware forming machines, the general operation followed comprises initially forming a molten gob of glass into a parison in a blank mold and then transferring the parison to a blow mold where the parison is expanded in a blowing operation to the final form of the hollow article. The molten glass gob is usually dropped into the parison or blank mold which, in the case of a bottle forming machine, has a mold contour comparable to a miniaturized version of the finished bottle in the neck-down position. A pair of neck ring segments or a split neck ring supported in generally horizontally positioned neck ring arms forms the neck portion of the parison at the bottom of the blank mold. After the parison has taken shape, the blank mold moves away from the parison and the neck ring arms, pivoting about a transverse horizontal axis, transfer the parison to the blow mold and invert the parison to a neck-up position in the process. The numerous components and the timing operations accompanying the various molding steps of one such glassware forming machine are described in greater detail in the cited U.S. Pat. No. 1,911,119 to which reference may be had for a better understanding of the present invention.

Increased production rates of IS glassware forming machines and the attendant increases in economy have been achieved by multiplying the numbers of molds in any one section. Double and triple-gob machines, terms denoting the number of mold sets involved in any individual section, are in current use. In a double-gob machine, two blank molds set side by side and a corresponding pair of blow molds also set side by side are positioned respectively at opposite sides of a horizontal axis about which the neck ring arms rotate while inverting and transferring the parisons from the blank mold side of the machine to the blow mold side of the machine.

It will be readily understood that the geometric relationship of the pivot axis, the neck ring arms, the centers of the blank molds and the centers of the blow molds is critical and calculated to permit the neck rings to open or close about the central axes of the molds. It is also desirable to be able to change the molds on each side of the machine so that articles of different sizes or shapes can be formed with the same basic machine. Larger articles, however, require larger blow molds and it may be necessary to space the blow molds at greater distance from one another than with smaller articles. Increasing the spacing of the blow molds in a machine with conventional neck ring arms requires a corresponding increase in the spacing of the blank molds and the charging, pressurizing, and other associated equipment. Designing a machine with equal mold separation on both sides of the machine can result in greater overall size and wasted space. Modifications of an existing machine for larger articles may also entail extensive rebuilding and rearranging of the machine components.

It is accordingly a general object of the present invention to provide a pair of complementary neck ring arms which can be utilized with glassware forming machines having blank molds and blow molds of different sizes and different spacing or separation. With such arms, it is possible to reduce the overall size of a machine and to limit the modifications in existing machines to accommodate larger blow molds. The invention can be applied to either single or multi-gob machines.

SUMMARY OF THE INVENTION

The present invention resides in a neck ring arm for a glassware forming machine or the like in which a parison is first formed in a blank mold and transferred by a pair of such neck ring arms to a blow mold. The arm is comprised of a base portion and a movable portion. The base portion includes fastening means for connecting the neck ring arm to the glassware forming machine and the movable portion is supported from and movable with respect to the base portion. The movable portion includes a neck ring mount in which a neck ring segment may be received. Motor means are connected between the base portion and the movable portion of adjustably positioning the portions with respect to one another during the transfer of the parison from the blank mold side to the blow mold side of the machine. By locating the neck ring mount in a movable portion of the neck ring arm, it is possible to separate the blank molds by an amount different from the separation between the blow molds and to locate the centers of the blank molds and the blow molds at different distances from the axis about which the neck ring arms rotate during the transfer of the parison between the molds. It is therefore possible to utilize large blow molds requiring greater separation than with the blank molds and to extend the neck ring arms during the transfer process. The neck ring arm may include a plurality of movable portions, each with a neck ring mount, supported serially from the base portion to operate in multi-glob machines.

BRIEF DESCRIPTION OF THE DRAWINGS

FIG. 1 is a plan view of two complementary neck ring arms embodying the present invention and shown in two different positions, one corresponding to a position on the blank mold side of the glassware forming machine and the other in phantom corresponding to a position of the same arms over the blow mold side of the machine.

FIG. 2 is an enlarged plan view showing the neck ring support arms in detail in the retracted condition.

FIG. 3 is a front elevational view of the neck ring arms shown in FIG. 2.

FIG. 4 is a sectional view of the connection between the intermediate section of the neck ring arm and the fluid actuated piston and cylinder assembly as seen along the sectioning line 4—4 in FIG. 3.

FIG. 5 is a sectional view of the latching mechanism in the outer neck ring support arm section as seen along the sectioning line 5—5 of FIG. 3.

FIG. 6 is an enlarged plan view of the neck ring arms in the inverted, extended and spread condition.

DESCRIPTION OF THE PREFERRED EMBODIMENTS

In FIG. 1 a pair of the neck ring arms embodying the present invention are shown in two positions related respectively to the blank mold and blow mold sides of a glassware forming machine or the like such as that shown and described in the cited U.S. Pat. No. 1,911,119. The neck ring arms, generally designated 10 and 12, respectively, are complementary arms in that they cooperate with one another to support the two halves or segments of a split neck ring which partially forms and grasps a parison over the blank mold side of the machine and transfers the parison from the blank mold side of the machine to the blow mold side of the machine. The arms 10 and 12 have mountings including the semicircular recesses 14, 16, 18 and 20 in which two sets of neck ring segments are nested in the arms. The provision for two sets of neck ring segments indicates that the arms 10 and 12 are adapted to operate in a double-gob glassware forming machine having dual blank molds which, for a clearer understanding of the invention, are located (but not shown) on one side of the machine to the left of the horizontal pivot axis 22 of the arms and dual blow molds located (but not shown) on the other side of the machine to the right of the pivot axis 22.

The complementary arms 10 and 12 can be moved or spread in the direction of axis 22 in order to open and close the arms and the split neck rings. With the arms closed and the neck rings registering with the overlying blank molds, molten glass is dropped from an overhead feeder into each of the blank molds, and the neck rings with the assistance of a neck pin or plunger form the neck of the parisons. The blank molds are then moved from above the neck ring arms 10 and 12 to permit the arms to be rotated 180° about the horizontal pivot axis 22 to the inverted, phantom position over the blow molds at the opposite side of the machine. The inverting motion of the arms brings the parisons into the neck-up position at the respective centers of the blow molds. The arms 10 and 12 are finally moved away from one another in the direction of axis 22 to open the neck rings and release the finished ware.

In accordance with the present invention, the neck ring arms 10 and 12 are capable of extending and retracting in the longitudinal direction along which the neck rings and associated molds are aligned. As seen in FIG. 1, the neck ring arme 10 is composed of a base section 30, an intermediate section 32 and an outer section 34. Correspondingly, the arm 12 is composed of a base section 40, an intermediate section 42 and an outer section 44. By providing a multi-section arm, it is possible to extend and retract the arm and thereby adjust the positions of the sections by preselected amounts. The extension and retraction of the arms 10 and 12 preferably occur as the arms are pivoted about the axis 22.

The ability to adjust the positions of the sections with respect to one another permits the arms to be utilized in a machine with a pair of blank molds having a given offset from the axis 22, represented, for example, in FIG. 1 by the distance $a+b$, and a given separation between centers, the distance $c$, and a pair of blow molds having the same or a different offset from the axis 22, represented by the distance $a+b+1$, and the same or a different separation between centers, the distance $c+1$. The extendable feature of the arms permits greater versatility in the use of the machine since larger blow molds can be installed on existing machines without requiring extensive modification to the blank mold side of the machine and a more compact arrangement of the molds can be had since the pivoting axis 22 need not be located exactly at the midpoint between the molds at each side of the machine.

FIGS. 2-5 show the detailed construction of the two complementary neck ring arms 10 and 12. The arms are allochrial in that they have the same construction except for the fact that the arrangement and the shapes of the parts are mirror images of one another. Therefore, except when necessary for clarity, only the arm 10 is described hereinafter, it being understood that the arm 12 has corresponding parts.

The base section 30 of the arm 10 includes two tongue-and-groove fasteners 50 and 52 which slide over a mating way on the glass forming machine to connect the entire arm 10 to the machine in cantilever fashion wtih the one end projecting outwardly in the longitudinal direction from the axis 22. The fastenings 50 and 52 maintain the arm generally perpendicular to the axis 22 during translation parallel to the axis and rotation about the axis.

A fluid actuated piston and cylinder assembly 60 is fixedly positioned on the base section 30 and serves as a connection between the sections 30, 32 and 34 and as a motor for moving the extendable sections 32 and 34 with respect to the base section 30. The assembly 60 includes a cylinder 62 which may be mounted in or integrally formed in the base section 30 as shown, a piston 64 having a piston rod 66 and fastening screw 68 and a sleeve 70 mounted concentrically on the piston rod 66 and integrally connected with a piston spacer 72 interposed between the piston 64 and the one end of the cylinder 62 through which the piston rod 66 extends. The opposite end of the cylinder 62 is closed by means of a fixed plug 74 having a central fluid port 76 through which an actuating fluid such as compressed air is delivered to extend the piston 64 and sleeve 70. Another fluid port 78 and conduit 80 in the section 30 lead to an annular chamber at the opposite end of the cylinder 62 to permit the piston 64 to be retracted in the cylinder 62. In this respect, the outer periphery of the spaced 72 is fluted to provide a plurality of axially extending openings 82 which insure that the actuating fluid admitted through port 78 operates against the one side of the piston 64 throughout the full stroke of the piston within the cylinder 62.

The rod 66 and the sleeve 70 project from the cylinder 62 through the base section 30 and into the intermediate section 32. The sleeve terminates within a bore 90 in the section 32 and the piston rod 66 extends entirely through the section 32 to the outer section 34. As most clearly seen in FIG. 4, the sleeve 70 has an annular slot 92 which is engaged by a U-shaped clip 94 fastened to the intermediate section 32 by means of bolts 96 and 98 to secure the sleeve fixedly to the section 32. The rod 66 passes through the section 32 in close fitting, sliding contact. A guide pin 98 is press-fitted into the projecting end of the base section 30 and extends parallel to the piston rod 66 and sleeve 70 into the section 32 in sliding contact. The piston rod 66, the sleeve 70, and the guide pin 98 cooperate to connect the intermediate section 32 to the projecting end of the base section 30 and permit the base section 32 to be moved in the longitudinal direction relative to section 30 during extension and retraction of the arm 10.

As mentioned, the piston rod 66 extends through the projecting end of the intermediate section 32 and it is fixedly engaged with the outer section 34 by means of alignment pin 110 and a cap screw 112. Another guide pin 114 press-fitted in the projecting end of the intermediate section 32 and extending parallel to the rod 66 into the section 34 in sliding engagement cooperates with the piston rod 66 in supporting the outer section 34 from the projecting end of section 32. It will thus be seen that the sections 30, 32 and 34 are serially interconnected and movable with respect to one another in the longitudinal direction parallel to the piston rod 66, a direction normal to the pivot axis 22 (FIG. 1), to cause the arm 10 to be extended or retracted.

As described above, each of the movable sections 32 and 34 includes a mount for retaining a semicircular neck ring segment, the corresponding segment being mounted in the corresponding portions of the movable sections 42 and 44 respectively of the arm 12. The recesses 14, 16, 18 and 20 in which the neck ring segments are nested may contain annular retaining grooves 120, 122, 124 and 126 or may be otherwise adapted to accept conforming neck ring segments. A latching mechanism shown in FIGS. 2 and 5 is contained within the section 34 to releasably mount a neck ring segment in the recess 16 in conjunction with a fixed tang 130 in the one end of the groove 122. The latching mechanism is comprised principally of a cap screw 132 which slides axially of itself in a bore 134 in the section 34 and is threadably engaged with a slidable tang 136. The screw 132 and tang 136 are biased toward the lateral side of the section 34 by means of a spring 138 and, with a neck ring segment mounted in the recess 16, hold the segment in place in the section 34. Tangs corresponding to tangs 130 and 136 are located in the recesses of the other movable sections to hold the other neck ring segments in place.

The operation of the extendable neck ring arms 10 and 12 is best understood by a comparison of FIGS. 2 and 6 which show the arms in the retracted and extended positions respectively. The piston and cylinder assemblies within the base sections 30 and 40 are actuated simultaneously by a timing device in the machine to extend and retract the arms at a specified time in the glass forming operation, generally during the period in which the arms 10 and 12 are pivoting about the axis 22 (FIG. 1) between the blank mold and blow mold sides of the machine.

To extend the arms, fluid is introduced from an air valve in the machine through the port 76 and pushes the piston 64 through the cylinder 62 with attendant displacements of the rod 66 and the sleeve 70 connected to the movable sections 32 and 34 respectively. As the piston 64 moves toward the projecting end of the arm, it must first move a given distance before it engages the spacer 72 and causes the sleeve 70 to be translated, assuming that friction between the rod 66 and sleeve 70 does not initiate sleeve movement prior to engagement of the piston 64 and spacer 72. Regardless of the sequence of displacements of the piston 64 and spacer 72, the total displacement of the sleeve 70 is less than that of the rod 66 which is apparent from a comparison of the components shown in FIGS. 2 and 6. As seen in FIG. 6, the movable segments 32 and 42 are spaced from the base segments 30 and 40 by one unit length and the movable segments 34 and 44 are displaced from the movable segments 32 and 42 respectively by one unit length, thus indicating that the segments 34 and 44 have moved twice as far as the segments 32 and 42. With the arms extended, the parisons supported therein can be released in blow molds which have a distance between centers greater by one unit length than the distance between the centers of the blank molds. Of course, it is readily apparent that different displacements of the movable sections can be had by varying the width of the spacer 72 and length of the cylinder 62. Also, the differential offset of the molds from the pivoting axis 22 can be varied by changing the length of the cylinder 62.

The retraction of the extendable neck ring arms is also controlled by the glassware forming machine to occur at an appropriate time, generally after the arms have been spread as shown in FIG. 6 to release the finished glassware at the blow molds. During retraction of the extendible arms 10 and 12, fluid is admitted from a valve through the port 78, conduit 80 and the fluted spacer 72 to the outer side of piston 64 to retract the rod 66 and the sleeve 70. During the retraction process, the piston rod 66 and the outer section 34 are retracted first unless friction between the sleeve 70 and rod 66 causes both sections 34 and 32 to move together until the section 32 abuts the projecting end of base section 30. In either case, the movable sections return to their original, retracted positions shown in FIG. 2 in serially abutting relationship.

It will thus be seen that the neck ring arms can be extended and retracted to cooperate with blank molds having a given center-to-center dimension and blow molds having a different center-to-center dimension and provide glassware forming machines with a greater versatility than that permitted with fixed length neck ring arms.

While the present invention has been described primarily in a single preferred embodiment, it should be understood that modifications and substitutions can be had without departing from the spirit of the invention. For example, it is readily apparent that the base sections 30 and 40 could be provided with recesses so that another pair of complementary neck ring segments could be supported on the arms for use in a triple-gob glass forming machine. It is also feasible to add further movable sections to the neck ring arms to accommodate other multi-gob machines. Additionally, it is contemplated that neck ring arms having one base section and one movable section could be utilized in either single-gob or double-gob machines and the movable section may be located radially inward of the base section. While separate piston and cylinder assemblies have been incorporated in each of the base sections 30 and 40, it is possible to utilize a single piston and cylinder assembly mounted to each of the base sections and connected to each of the movable sections for extending and retracting the arms simultaneously.

I claim:

1. In a glassware forming machine or the like in which a parison supported by a pair of mating neck ring segments is inverted by pivoting a pair of complementary neck ring support arms about a pivot axis in the machine, the pair of complementary neck ring support arms, each arm comprising: a first arm section pivotally connected at one end to the glassware forming machine for movement about the pivot axis and having the opposite end projecting in cantilever fashion from the end end; and a second extendible arm section connected to the projecting end of the first arm section and movable relative to the first arm section toward and away from the projecting end of the first arm section, the second section having a recess conforming to a neck ring segment whereby a neck ring segment may be nested in the second extendible arm section.

2. The pair of complementary neck ring support arms as defined in claim 1 further including alignment means extending between the first and second arm sections to maintain the second section linearly aligned with the first during the relative movement of the sections.

3. In a glassware forming machine, the complementary neck ring support arms as defined in claim 1, wherein each arm further includes a third arm section connecting the one end of the first arm section to the glassware forming machine by an adjustable connection, the adjustable connection between the first and third arm sections permitting relative movement between the first and third sections parallel to the relative movement between the first and second arm sections; and wherein the first arm section has a recess conforming to a neck ring segment complementing a neck ring segment on the other support arm of the pair.

4. The neck ring support arms as defined in claim 3 wherein motor means is connected to each of the arm sections for adjustably positioning the arm sections of one arm relative to one another, and the first, second and third sections on the one arm in complementary relationship with the first, second and third sections on the other arm respectively.

5. The neck ring support arms as defined in claim 4 wherein the motor means comprises two piston and cylinder assemblies, one of the assemblies being connected to the arm sections of one of the complementary neck ring support arms, and the other of the assemblies being connected to the arm sections of the other of the complementary neck ring support arms.

6. In a glassware forming machine, the complementary neck ring support arms as defined in claim 1 wherein each arm further includes a third extendible arm section connected to the second arm section and also movable toward and away from the projecting end of the first arm section, the third section having a recess conforming to a neck ring segment complementing a neck ring segment in the other support arm of the pair.

7. The neck ring support arms as defined in claim 6 wherein motor means is connected to each of the arm sections for adjustably positioning the arm sections of one arm relative to one another, and the first, second and third sections on the one arm in complementary relationship with the first, second and third sections on the other arm respectively.

8. The neck ring support arms as defined in claim 7 wherein the motor means includes at least one piston and cylinder assembly connected to each of the arm sections of one of the complementary support arms, the assembly having a cylinder positioned on the first arm section, a piston movable within the ends of the cylinder and connected to one of extendible arm sections through the one end of the cylinder, a spacer between the piston and the one end of the cylinder and a member interconnecting the spacer and the other of the extendible arm sections.

9. The complementary neck ing support arms as defined in claim 6 wherein each of the extendible arm sections includes latch means cooperating with the recess for releasably securing a neck ring segment to the extendible arm section in the recess.

10. The pair of complementary neck ring support arms as defined in claim 1 further including motor means connected between the first and second arm sections of each support arm for producing the relative movement between the sections.

11. A neck ring arm of a glassware forming machine or the like which forms a parison in a blank mold and transfers the parison in mating neck ring segments to a blow mold by pivoting a pair of such neck ring arms about a pivot axis between the molds comprising: a base portion of the arm including fastening means for joining the arms to the glassware forming machine for pivoting movement about the pivot axis between the blank and blow molds; a movable neck ring support portion supported from the base portion and linearly movable with respect to the base portion to various positions closer and and farther from the pivot axis between the blank and blow molds, the movable neck ring support portion including a neck ring mount in which a neck ring segment may be received; and motor means interconnecting the base portion and the movable neck ring support portion for adjusting the position of the movable neck ring support portion and the neck ring mount with respect to the base portion.

12. A neck ring arm as defined in claim 11 wherein the motor means comprises a fluid operated piston and cylinder assembly, the piston being connected to one of the arm portions and the cylinder being associated with the other of the arm portions whereby relative displacement of the piston and cylinder produces a corresponding displacement of the arm portions.

13. A neck ring arm as defined in claim 12 wherein the piston and the cylinder of the motor means are fixedly located on the respective portions of the arm whereby the arm portions are at least partially supported from one another by means of the piston and cylinder assembly.

14. A neck ring arm as defined in claim 11 wherein the arm includes a plurality of movable neck ring support portions supported from the base portion and linearly movable with respect to the base portion, each movable portion including a neck ring mount; and the motor means is connected to each of the pluarity of movable portions to adjustably position the movable portions with respect to the base portion.

15. A neck ring arm as defined in claim 14 wherein the plurality of movable neck ring support portions are supported in serially adjacent and aligned relationship from the base portion.

16. A neck ring arm as defined in claim 11 wherein the arm includes two of the movable neck ring support portions supported from the base portion and a neck ring mount in each movable portion, the one movable portion being interposed between the base portion and the other movable portion; and the motor means is connected to each movable portion to displace the movable portions away from the base portion by different predefined amounts.

17. A neck ring arm as defined in claim 16 wherein the motor means for displacing the movable neck ring support portions comprises a piston and cylinder assembly mounted to the base portion and having a piston rod, the piston rod extending from the one end of the cylinder and from the base portion thorugh the intermediate movable portion and connected to the other movable portion, the piston and cylinder assembly also incnluding a spacer within the cylinder between the piston and the one end of the cylinder and a sleeve mounted coaxially of the piston rod and connected at one end to the spacer and at the other end to the intermediate movable portion.

18. A neck ring arm as defined in claim 17 wherein alignment pins extend parallel to the piston rod between each of the portions of the arms.

References Cited

UNITED STATES PATENTS

| 2,702,444 | 2/1955 | Rowe | 65—167 |
| 1,502,560 | 7/1924 | Glaspey | 65—232 |
| 2,290,129 | 7/1942 | Moreland et al. | 65—229 X |
| 1,694,867 | 12/1928 | Samuelson | 65—232 X |
| 1,849,555 | 3/1932 | Sears | 65—232 X |
| 1,626,703 | 5/1927 | Soubier | 65—235 X |

FRANK W. MIGA, Primary Examiner

U.S. Cl. X.R.

65—232, 235, 241, 323, 361